Patented Nov. 20, 1928.

1,692,662

UNITED STATES PATENT OFFICE.

ROBERT M. ISHAM, OF OKMULGEE, OKLAHOMA, ASSIGNOR TO DOHERTY RESEARCH COMPANY, OF NEW YORK, N. Y., A CORPORATION OF DELAWARE.

ETHYL-ALCOHOL SUBSTITUTE AND PROCESS FOR MAKING SAME.

No Drawing.   Application filed May 6, 1926. Serial No. 107,262.

The present invention relates to a substitute for ethyl alcohol and has as its principal object the provision of a product having an odor similar to that of ethyl alcohol and having closely analogous solvent, medicinal and other properties.

It is well known that, in many commercial processes operated on a considerable scale, the use of ethyl alcohol is dictated by considerations of odor. In certain drugs, perfumes and barbers' specialties it has been proposed to substitute isopropyl alcohol for ethyl alcohol, the solvent properties of the isopropyl alcohol being at least equivalent to those of the ethyl alcohol in most cases. The use of isopropyl alcohol for such purposes, however, has been severely limited by its odor. The product according to the present invention, although consisting largely of isopropyl alcohol, may be substituted for ethyl alcohol in a wide variety of products with substantially no detrimental effect due to the odor.

According to the present invention, the odor of isopropyl alcohol is modified to resemble that of ethyl alcohol by adding to the isopropyl alcohol acetaldehyde or butyl acetate or, preferably, a mixture of acetaldehyde and butyl acetate. When both acetaldehyde and butyl acetate are added to the alcohol, the preferred proportions of acetaldehyde and butyl acetate to isopropyl alcohol are 3 c. c. of acetaldehyde and 6 c. c. of butyl acetate to 5 gallons of 90% isopropyl alcohol. In case the acetaldehyde or the butyl acetate is used by itself the quantity of aldehyde or acetate to be added to the isopropyl alcohol is best determined by a preliminary test. In either case, a relatively small amount of aldehyde or acetate causes the odor of the isopropyl alcohol to more nearly resemble that of ethyl alcohol.

Acetaldehyde is a much more powerful material, so far as odor is concerned than butyl acetate. Also, the odor is entirely different. The acetaldehyde furnishes the primary odor of ethyl alcohol and the esters the after odor. The introduction of acetaldehyde into the isopropyl alcohol amounts to the introduction of the most volatile and most odoriferous constituent present in commercial ethyl alcohol. It can therefore be used alone with very fair results, giving a product whose primary odor is similar to that of grain alcohol, but which lacks the vinous after odor. Butyl acetate, like the rest of the esters, has a fruity odor, and the addition of a trace to isopropyl alcohol helps to make the odor of the mixture approximate the vinous quality of the odor of grain alcohol. All the acetates of the primary and secondary alcohols as from the ethyl to the amyl esters are somewhat similar in odor. They may be substituted for butyl acetate, if desired, in the mixture according to the present invention, although normal butyl acetate is preferred.

Each of the ingredients, acetaldehyde and acetate therefore contributes individually an odoriferous factor pronouncedly modifying the odor of the isopropyl alcohol in the direction of the odor of the ethyl alcohol.

Having thus described my invention, I claim:

1. A product containing isopropyl alcohol and acetaldehyde, the proportion of alcohol being greatly in excess of aldehyde and the product having an odor modified materially from that of isopropyl alcohol in the direction of that of ethyl alcohol.

2. A product including isopropyl alcohol and butyl acetate, the proportion of alcohol being greatly in excess of that of the acetate and the product having an odor modified from that of isopropyl alcohol in the direction of that of ethyl alcohol.

3. A product including isopropyl alcohol, acetaldehyde and butyl acetate, the proportion of alcohol being greatly in excess of the combined amount of aldehyde and acetate and the odor of the product resembling that of ethyl alcohol.

4. A product including isopropyl alcohol, acetaldehyde and butyl acetate in the proportions of 5 gallons of alcohol, 3 c. c. of acetaldehyde and 6 c. c. of butyl acetate.

5. A process of modifying the odor of isopropyl alcohol in the direction of that of ethyl alcohol comprising adding a small percentage of acetaldehyde to isopropyl alcohol.

6. The process of modifying the odor of isopropyl alcohol in the direction of that of ethyl alcohol comprising adding a small percentage of butyl acetate to isopropyl alcohol.

7. The process of modifying the odor of isopropyl alcohol to resemble that of ethyl alcohol comprising adding to the isopropyl alcohol a small percentage of acetaldehyde and acetate, the amount of acetate being substantially twice that of the aldehyde.

8. The process of modifying the odor of isopropyl alcohol to resemble that of ethyl alcohol comprising adding to the isopropyl alcohol a small percentage of acetaldehyde and acetate.

9. A product including isopropyl alcohol, acetaldehyde and acetate, the proportion of alcohol being greatly in excess of the combined amount of aldehyde and acetate, and the odor of the product resembling that of ethyl alcohol.

In testimony whereof I affix my signature.

ROBERT M. ISHAM.